United States Patent [19]

Candy

[11] Patent Number: 5,576,624
[45] Date of Patent: Nov. 19, 1996

[54] PULSE INDUCTION TIME DOMAIN METAL DETECTOR

[75] Inventor: Bruce H. Candy, Basket Range, Australia

[73] Assignee: BHC Consulting Pty Ltd., Glenside, Australia

[21] Appl. No.: 253,870

[22] Filed: Jun. 3, 1994

Related U.S. Application Data

[63] Continuation-in-part of Ser. No. 468,471, Jan. 12, 1990, abandoned.

[30] Foreign Application Priority Data

Jan. 12, 1989 [AU] Australia .................................. PJ2261

[51] Int. Cl.⁶ ............................. G01V 3/11; G01R 33/12
[52] U.S. Cl. ............................................ 324/329; 324/239
[58] Field of Search .................................. 324/326, 327, 324/328, 329, 336, 233, 239

[56] References Cited

U.S. PATENT DOCUMENTS 4,110,679  8/1978  Payne .
4,393,350  7/1983  Hansen et al. .
4,868,504  9/1989  Johnson .

FOREIGN PATENT DOCUMENTS 2041532  9/1980  United Kingdom .

OTHER PUBLICATIONS

Corbyn: "Pulse Induction Metal Detector" —Wireless World—Mar. 1980—vol. 86, No. 1531–pp. 40–44, 324/329.

*Primary Examiner*—Walter E. Snow
*Attorney, Agent, or Firm*—Cushman Darby & Cushman, L.L.P.

[57] ABSTRACT

This invention is for a pulse induction metal detector which uses combinations of the signal detected during non-transmission of the magnetic field to eliminate those contributions to the signal due to the remanent magnetization of ferrites and asynchronous magnetic fields within the target volume.

37 Claims, 5 Drawing Sheets

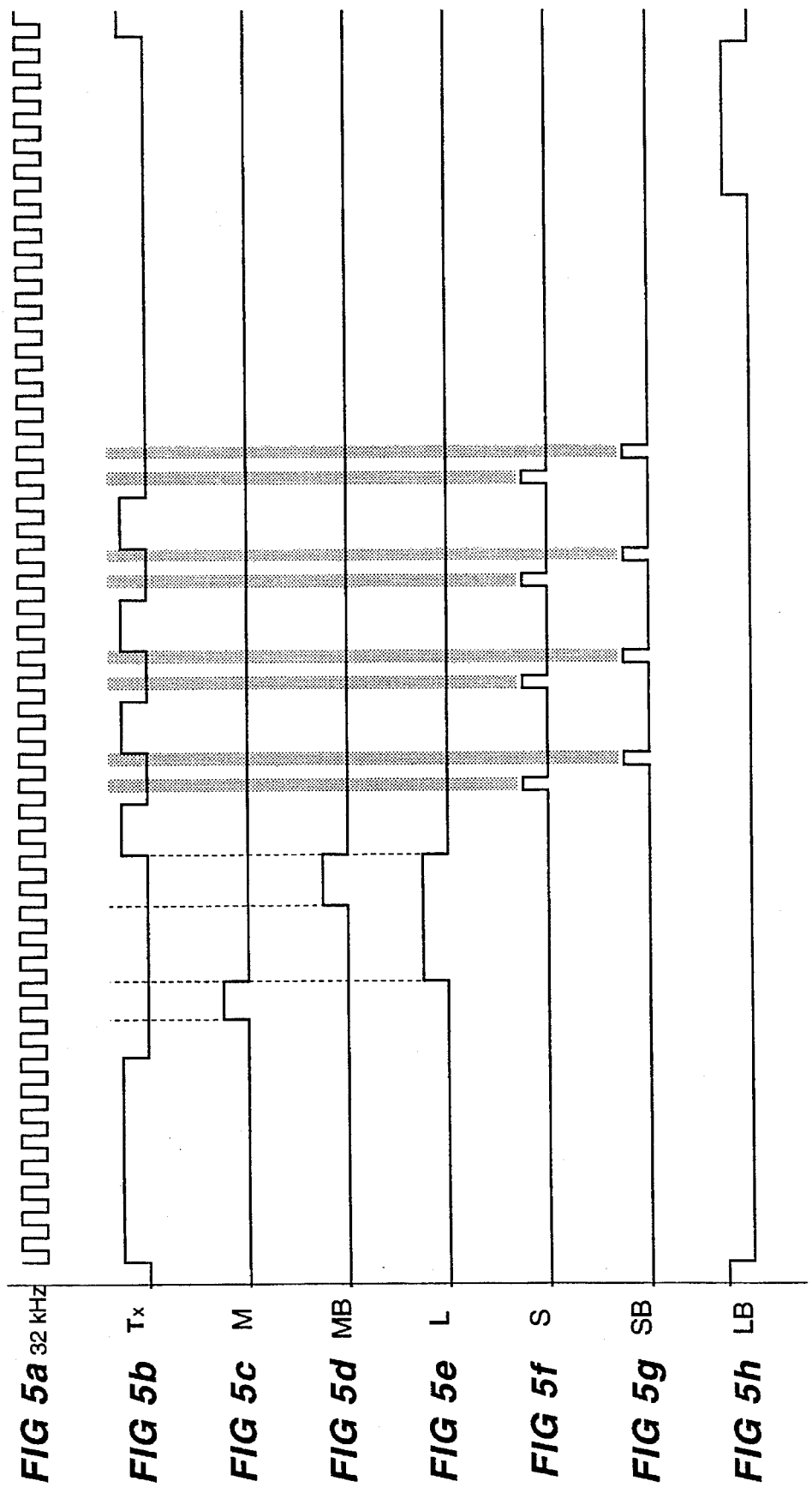

5,576,624

PULSE INDUCTION TIME DOMAIN METAL DETECTOR

REFERENCE TO RELATED APPLICATION

This is a continuation-in-part of application Ser. No. 07/468,471, filed Jan. 12, 1990, which was abandoned upon the filing hereof.

BACKGROUND OF THE INVENTION

In particular, this invention relates to the detection of conducting metal target objects situated in environments which, through their own magnetic and electrical properties, interact with the fields transmitted by metal detectors and thence or otherwise the detection apparatus of such a detector. A consequence of the intimate physical proximity of a target object with such an environment is that the magnetic signal from the target object has hitherto been difficult to distinguish from the background magnetic signals produced by the said environment using any of the metal detectors currently available and/or described. The difficulty of detection and discrimination in such an environment increases when the electrical and magnetic properties of the target objects vary greatly between instances of the target objects, as is usually the case.

The environments previously alluded to provide significant magnetic reactive and/or resistive components in their transmitted fields, as well as providing temporally quasi-static fields which can induce signals in a detector as it moves through spatial variations in those quasi-static fields.

The object of this invention is to produce a method and apparatus by which greater sensitivity to metallic target objects can be achieved in such difficult environments.

CROSS REFERENCE TO RELATED APPLICATIONS

A description of the methods and apparatus of various types of metal detectors follows.

A metal detector is used to detect the presence of conductive metal target objects of a range of sizes within the target volume. The target volume is defined by the characteristics of that metal detector, that is it is that volume of space containing objects whose transmitted magnetic fields induce interpretable signals in the receiving coil of the detector; this definition is not taken to include the source of the magnetic field of the Earth.

The detector generally consists of a means to transmit a magnetic field throughout the target volume;

a means with which to detect magnetic fields emanating from and passing through components within that target volume;

a means to demodulate any signals detected by the means of detection;

means to process the said demodulated signals in such a way as to distinguish those components of the signal attributable to one or more target objects and those components of the signal attributable to the environment in which the target objects are located; and a means to indicate to an operator the presence of signals indicative of metallic target objects within the target volume.

Metal detectors are commonly used to detect native metals, for instance gold, embedded in environments which are rich in magnetic and conductive components. The signals due to the interaction of the said environment with the metal detector can be, and often are, much stronger than those due to the interaction of the metallic target objects with the detector.

A successful metal detector should be able to detect and acknowledge the presence of conductive metallic target objects within the target volume. Further, the successful metal detector must discriminate against the signals due to the environment contained within the target volume in order that the often weaker signals due to the metallic target objects can be discerned over the signals due to the magnetic and conductive components of the environment. It is this discrimination against signals due to the environment which accounts for most of the effort expended in the design of discriminating metal detectors.

Consider, for clarity in the description of the theory of operation of a metal detector, an idealisation of the metal detector where the capacitances between windings of both the transmitting coil and receiving coil can be considered to be negligible;

where the capacitance between the transmitting coil and the receiving coil can be considered to be negligible;

where the load presented to the receiving coil by the detection electronics is effectively infinite unless otherwise stated;

where the induced eddy currents in the transmitter or receiver coil may be considered to be negligible;

where the transmitting and receiving coils and/or circuits are implemented such that the signal received is in no way due to transmission directly from the transmitting coil to the receiving coil.

Thus, for the analysis which follows, the received signal may be considered as the induced current resulting from changing magnetic flux, where the amplitude of that current is directly proportional to the rate of change of magnetic flux passing through the receiver coil.

In the art of metal detector design, there are two main ways of describing and analysing the processes employed;

frequency domain analysis, sometimes called Fourier analysis; and time domain analysis.

In frequency domain analysis, the received signal can be thought of as being divided into two components for each Fourier component of the transmitted signal;

that component which has a phase angle of plus or minus 90 degrees with respect to the same Fourier component of the transmitted signal, called the "magnetic" or "reactive" component;

that component which is in phase or anti-phase with the same Fourier component of the transmitted signal, known as the "loss" or "resistive" component.

The environment, otherwise known as the ground, re-transmits signals comprising both components. Two sources of these re-transmitted signals dominate in most ground;

ironstone, which induces a substantially reactive signal; and mildly conductive components of the ground which induce resistive signals, for example those produced in moist ground containing salts.

The reactive signals induced by the ferrite component of the ground are usually more than 30 times greater than the resistive signals induced by the conductive components. The most difficult reactive environment for detecting highly conductive metal targets, such as coins, gold and metal pipes, is that containing large concentrations of ironstone and whose ratio of resistive to reactive components of signal varies spatially over the ground. The difficulty of detecting metals in such an environment is increased if it also contains moderately electrically conductive components.

Many commercially available metal detectors transmit a substantially sinusoidal signal with a frequency within the range 1 kHz to 100 kHz. The received signal is synchronously demodulated and passed through a low-pass filter to remove both noise and carrier related signals. Such art shall be called single frequency (SF) detectors.

The main element of the SF detector which facilitates discrimination of the metal target signals from the ground signals is the synchronous demodulator (SD). In the case of the SF detector, the phase of the signal from the SD is synchronised with respect to the phase of the transmitted signal, while its magnitude is derived from the received signal. The value of this phase difference is set such that the signal from the SD negates the received ground signal, that is it is in quadrature with the received signal. The phase of the received ground signal is usually within a few degrees of the phase of the reactive component of the received signal.

The successful use of SF detectors relies on the spatial rate of change of the phase of the ground signal. Slow changes in the phase, that is gradual changes in the ground signal, can be recognised and compensated for with adjustment of the phase of the SD; this said adjustment shall be called "ground balancing" and its successful application shall be called "ground balance".

Generally, the presence of a highly conductive metallic target object within the target volume institutes a spatial discontinuity in the magnetic and electrical properties of the target volume. Movement of the receiving coil over a target volume containing such a discontinuity will, in general, produce a sudden change in phase of the received signal which is easily recognised as not being due to the normally continuous and slowly changing properties of the ground.

A variation of the art of SF detectors described above is that of multiple frequency (MF) detectors. This method of substantially reducing the signals arising from the ground is described in Australian patent applications PH7889 and PJ0991 and U.S. Pat. No. 4,942,360. These documents describe an apparatus adapted to transmit at least two substantially sinusoidal signals. The apparatus is adapted to select linear combinations of reactive and resistive signals of at least two transmitted signals such that the mildly conductive ground components are substantially cancelled, or the ironstone "resultant ground vector" is substantially cancelled, or both, while maintaining sensitivity to signals from target metal objects within the target volume.

Even though MF detectors have considerable advantages over SF detectors, they require electronic circuitry with a large dynamic range which leads to significant non-linearity in the circuitry, mitigating the degree of improvement over SF art which would have been possible otherwise. Stable and accurate electronic components are required for the improvements to be maximised.

The two examples of prior art described above are generally categorised as frequency domain (FD) detectors, the nomenclature reflecting the means of analysis when describing the signals transmitted and received by the detector, that is Fourier analysis; the signals are compared, largely, in terms of frequency and relative phase.

The other main group of examples of the prior art is that known as time domain (TD) detectors. In this group, the relevant signals are described in terms of their temporal evolution, rather than explicitly comparing their phases and frequencies. The subject of this patent is a detector categorised as belonging to the class of TD detectors.

Moreover, the subject of this patent is a detector of the type known as a pulse induction (PI) detector. PI detectors transmit transient magnetic pulses, rather than sinusoidally varying magnetic signals. Each pulse is initiated by the application of a dc voltage across the transmitting coil for a pre-determined period, creating and increasing current in the coil. Some PI detectors, including part of this invention, have a "binary" transmit/receive cycle where the voltage applied to the transmitting coil is the same for each transmission period and zero between the transmission periods.

As the current in the transmitting coil increases, there is a concomitant increase in the transmitted magnetic field intensity. The termination of each pulse is effected by removing the applied voltage from the transmitting coil. The transmitting coil is critically damped and the back electromotive force, generated when voltage is no longer applied to the coil, is clamped using a suitable device such as a Zener diode. After each transmitted magnetic pulse there is a period, usually several times longer than the decay time constant of the now damped transmitting coil, during which there is no voltage applied to the transmitting coil and signals from the target volume are detected by the receiving coil. The temporal interleaving of transmitting and receiving periods with no overlap of the two produces the possibility of a detector using just one coil to both transmit and receive signals.

A change in magnetic flux linking a conducting object induces a current in that object which is a function of the rate of change of magnetic flux linkage. The induced current is of a sense such that the magnetic field it produces tends to mitigate the change in the linked magnetic flux. For the purposes of this invention, these induced currents, when induced in any conducting elements within the target volume but not including the receiving coil, will be called eddy currents.

All soils are conductive to some degree, and environments such as sea water are more so. Such an environment can be thought of as providing a conductive loop in which eddy currents can be induced by a changing magnetic flux. Ground eddy currents do not decay entirely until some time after the cessation of the transmitted magnetic pulse. Their durations largely depend upon the resistivity of the environment and are of the order of 1 μs. In this invention and some commercial PI detectors, the problem of eddy currents in the environment is dealt with by disabling the detection circuitry of the detector until the environmental eddy currents have diminished.

Eddy currents are also induced in metallic target objects within the target volume. For metals, whose resistivities are low, the durations of induced eddy currents are generally orders of magnitude greater than the duration of ground eddy currents. For very small pieces of metal target object, the characteristic decay times of eddy currents might be of the same order as those of the ground eddy currents.

In the analysis of the operation of SF and MF detectors, it is generally held that that component of the magnetization of ferrite which is not associated with any quasi-permanent change in the physical structure of the ferrite is in phase with the transmitted field. There is a small lag in the magnetization of the ferrite, but for field transmission frequencies below 100 kHz this lag is small. However, after cessation of a unipolar transmitted pulse, there is some remanent magnetization of the ferrite within the target volume. This remanent magnetization decays in time and this decreasing magnetic field induces a signal in the receiving coil. Discrimination against such signals is main objective of this invention.

There are other sources producing magnetic fields within the environment of the target volume. Typically these fields are the quasi-permanent magnetization of rocks, known as palaeomagnetism, and the field which originally induced their magnetization, the geomagnetic field of the Earth. As a receiving coil moves with respect to the target volume, variations in both the intensities and directions of these fields can induce signals in that coil. This invention can also discriminate against these fields.

Whether or not only one coil is used for both transmitting and receiving signals, an advantage of such a PI detector over frequency domain detectors is that the receiving coil does not have to be physically nulled to the transmitted field. Nevertheless, no commercially available PI detectors are considered as performing as well as SF and MF detectors in regions with magnetic ground due to their inability to negate all of the signals produced by the environment after the cessation of a transmitted pulse.

In Patent GB 2041532A, Poole describes a PI apparatus which subtracts a proportion of one sampled value of the received signal from another, each sample being taken at different periods following the transmit pulse. In doing so, Poole claims to have solved the problem of signals arising from eddy current decay signals from the mildly electrically conducting ground components contaminating eddy current signals from metal objects. Poole claims that the invention is "particularly useful" for locating metal objects in salt water and cites the sea/sea-floor boundary as a specific problem area.

According to Poole the eddy current decay signal from the ground is more rapid than that from metal objects (other than very small metal objects) and thus if the said proportion is selected to minimise the local eddy current signals of the mildly conductive ground components, then metal objects will not be cancelled. However, the apparatus described by Poole will not universally cancel the mildly electrically conductive ground components owing to the fact that the decay rate depends on the relative orientation and position of the sensing coils relative to the interrogated ground, as well as on the conductivity of the local ground. For example, sea water is considerably more conductive than moist sea-side sand. Thus and hence the said proportion need be quite different to cancel each background medium. Poole has stated that the ground is "primarily resistive in nature". It is however, in much of the world, primarily reactive compared to resistive in nature by typically a factor of 30 to 100 times at typical metal detector operating frequencies. This is reflected in the range of ground balance settings available on most well known commercial detectors.

Poole does not offer to cancel principal interfering ground signals arising from magnetic soils, as is the subject of this specification, which can be universally cancelled.

In an article published in "Wireless World", May and June 1980, J. A. Corbyn describes a PI detector and an electronic circuit for that detector in which, in addition to discriminating against the ground eddy currents by not enabling the receiving means for some period immediately after the cessation of transmission, an attempt is made to discriminate against the remanent magnetization of the ferrite within the target volume induced by the transmitted magnetic pulse. Within the said article, as well as within some of its cited literature, the remanent magnetization of ferrite in the ground is credited to the effect called "magnetic viscosity".

In the circuit described by Corbyn, a transmitter coil transmits a magnetic field discontinuously, with alternating equal periods of transmission and non-transmission. Throughout the periods of transmission, the input of the receiver amplifier is grounded; amplification of received signals occurs between periods of transmission. There is also a delay after each transmission period in order to allow the eddy currents in the ground and the transmitting coil current to diminish to a level where they do not produce significant signal in the receiving means of the detector. The period during which the receiving amplifier is not grounded shall be called the analysing period.

Corbyn's circuit attempts to eliminate the effects of magnetic viscosity in the environment by electronically simulating that part of the signal which is due to the decay of the remanent magnetic field of the ferrite in the environment. Corbyn states that the magnetization, as a function of time, of ferrites in the environment is proportional to the magnetic susceptibility of the material, the change in the applied magnetic field H and a function g(t) which is a general function describing the form of the temporal evolution of the decaying magnetization. Corbyn further states that the function g(t) is independent of the magnetizing signal. The signal induced in the receiving coil of a detector will be proportional to the time derivative of g(t), which Corbyn claims is $$g'(t) = (1-P)\exp(-t/T_1) + P\exp(-t/T_2) \qquad (1)$$

where P, $T_1$ and $T_2$ are constants which were determined empirically. This expression is largely based on measurements which were obtained using methods which are not disclosed in Corbyn's article.

The apparatus uses an electronic circuit to produce a signal with the characteristics of equation (1) and subtracts that signal, of a magnitude related to the magnitude of the received signal, from the received signal. The proposal of Corbyn is that any departure in the received signal from the form of the "magnetic viscosity" signal will produce a non-zero output from the subtracting amplifier, perhaps indicating the existence of eddy currents in the target volume. Corbyn states that the form of the temporal evolution of the magnetization of the ferrimagnetic material is independent of the magnetizing field applied. However, it can be shown that the temporal evolution of the magnetizing of the ferrimagnetic material does depend upon the applied magnetic field, knowledge of which is essential when trying to predict the form of the demagnetization of the remanent magnetism.

It is a well known phenomenon in the study of magnetism that ferromagnetic materials and ferrimagnetic materials will generally be left partially magnetized after being immersed in, then removed from, an applied magnetic field H. This remaining magnetism is the remanent magnetization or is sometimes referred to as the "historical component" of the magnetization, as opposed to the instantaneous component which is present only when an external magnetic field is applied. It is the source of the magnetic viscosity referred to by Corbyn.

Ferrites fall into the class of ferrimagnetic materials and are the single most important materials when discussing the magnetic background signals of ground in the context of metal detectors. In this invention it is not important to know anything about the instantaneous magnetic field produced by the applied field interacting with the ferrite during periods of transmission from the detector, as the receiving coil is disconnected from the sampling and processing means during periods of transmission and the reactive components of the ground signal respond instantly to changes in the transmitted field, as described previously. It is, however, important to understand what happens at a microscopic level to the structure of the ferrite both during and after the application of a magnetic field.

In order to simplify the discussion of these changes, some restrictions will be placed upon the parameters involved in the discussion. Begin with a piece of unmagnetized ferrite. The magnetic field applied to the ferrite has finite duration; at all other times there is no applied magnetic field.

A suitable model of the ferrite, in terms of its magnetic properties, is to think of it as composed of microscopically sized magnetized particles. The magnetic field attributed to each of these particles is spatially aligned in a way which is determined by some internal characteristic of that particle. The thermal energy supplied by the environment to each particle can induce changes in a particle which might produce a change in the spatial alignment of its magnetic moment. In unmagnetized ferrite, free of any applied magnetic fields, the change in the direction of alignment of the magnetic moment of any particular particle is essentially random when it occurs; a bulk sample of unmagnetized ferrite, in an environment free of fields and at biospherical temperatures, will remain unmagnetized.

When a magnetic field is applied to the bulk ferrite, the particles continue to change those characteristics which determine the directions of their magnetic moments at the same average rate. However, the direction to which those magnetic moments change is no longer entirely random; there is a tendency for the magnetic moment of each particle, when it changes, to have some component which is aligned with the applied magnetic field. Each such particle contributes to the net remanent magnetization of the bulk ferrite.

As more time passes with the field applied, the greater the net change in the quasi-permanent magnetic moment of the bulk ferrite becomes. When the magnetic field is no longer applied, the remanent magnetization begins to decay via the same mechanism as it was built up, that is the alignments of the magnetic moments of the ferrite particles change at same average rate as during the period of applied field, except that now there is no applied magnetic field to induce a tendency for the magnetic moments to be aligned. There is, however, the remanent magnetic field of the bulk ferrite itself which provides a weaker tendency to alignment. Were this field constant, the decay of the remanent magnetization would be exponential, but whenever one of the aligned magnetic moments is randomised, the remanent field changes. Therefore, the temporal evolution of the demagnetization is not exponential. The process of decay of the remanent magnetism of ferrite shall be called ferrite relaxation decay (FRD).

It is the magnetic viscosity which, in part, causes the random change in the phase of the background of the received ground signal in frequency domain detectors. For simplicity of explanation, consider an SF detector. For the received signal, consider only those components which are due to the instantaneous magnetization of the ferrites along with the component due to the decay of the remanent magnetization of the ferrites. As the detector is moved over typical examples of ground, their relative magnitudes vary in a way which is unpredictable, producing a randomly varying phase in the resultant background signal and upsetting the ground balance of the detector.

It remains to express the time evolution of FRD in a form useful for application in this invention. Consider the case of a constant voltage applied across a transmission coil for a finite period. Assuming that the said circuit has no resistance in it, the current in the inductor increases linearly, along with the concomitant increase in transmitted magnetic field strength, while the voltage is applied. Assuming, also, that the decay of the transmitted magnetic field after the voltage is no longer applied is instantaneous, the FRD due to that magnetic field would have the form $$\frac{dM(\tau,t)}{dt} = \log\left(\frac{\tau+t}{t}\right) - \frac{\tau}{t} \quad (2)$$

where $\tau$ is the period for which the said voltage was applied, $t$ is the time elapsed since cessation of the applied field, M is the magnetization of the ferrite and log is the natural logarithm. According to our calculations, the form of relation (2) is the same for all types of ferrite; the calculations are confirmed by measurement. Note that no indication is given of the absolute magnitude of the magnetization. Examination of the relation (2) shows that, unlike the relation (1) given by Corbyn, the rate of FRD depends upon the duration of the applied magnetic field. A quantitative comparison of the two relations (1) and (2) shows that the relation (1), when calculated using the values of its parameters as Corbyn suggests, could not be construed as being a satisfactory model for the relation (2) for the purposes of negating the FRD signal.

There can be other sources of changing magnetic flux within the target volume. Two of these can be grouped together; the presence of magnetized materials such as rocks and the geomagnetic field of the earth. The magnetic field from rocks is generally very weak and their magnetization decays very slowly, reflecting the time it took to magnetize them with the weak geomagnetic field of the earth, that is often millions of years. In the time it usually takes to pass the head of a detector over a rock, the magnetization of these rocks can be regarded as constant. The earth field flux can vary spatially over short distances due to changes in the permeability of the ground, or the flux linking the receiving coil can vary as the angle of the plane of the coil changes inadvertently as the coil is moved over the target volume. The signals resulting from movement of the detector through these fields can often be far greater than the small signals from the deepest detectable targets.

THIS INVENTION

Therefore in one form of the invention though this need not be the only or indeed the broadest form there is proposed a conducting metal detection apparatus comprising:

transmission means including a transmit coil for transmitting a discontinuous pulse voltage waveform in order to transmit a magnetic field to a target volume, the discontinuous pulse voltage waveform providing periods of non-transmission of the magnetic field;

a detector coil for producing a detected signal by detecting changes in magnetic fields;

measurement means for measuring the detected signal during at least a first and a second pre-determined period which is separate from that period which has significant signal resulting from decay of ground eddy currents, the measuring occurring during the periods of non-transmission of the magnetic field, the measurement means further adapted to produce at least a first and a second measurement respectively; and processing means for processing at least two of the measurements to provide an output signal derived by substantially removing that component of the detected signal due to electrically non-conducting ferrite within the target volume from the said detected signal by forming a combination of the at least two measurements in a manner which recognises that the first time derivative of the magnetic field due to the electrically non-conducting ferrite during the periods of non-transmission depends upon the duration and temporal evolution of the transmitted magnetic field, the output signal thus being useful to indicate the presence of a metallic object within the target volume.

In preference the combination is a linear combination, said linear combination of the at least two measurements including the process of multiplying each measurement by a constant each said constant not necessarily the same as any other said constant and subtracting at least one such multiplied measurement from at least one other such multiplied measurement.

In preference the combination is a linear combination, said linear combination of the at least two measurements including the process of multiplying each measurement by a constant each said constant not necessarily the same as any other said constant and subtracting at least one such multiplied measurement from at least one other such multiplied measurement, each of the constants being selected so that a summation of the so processed measurement after the linear combination is zero when the measurements before the linear combination correspond to a detected signal induced by the changing magnetic field attributed to electrically non-conducting ferrite.

In preference the constants are selected so that a summation of the so processed measurements is zero where the signals before the said processing correspond to a detected signal induced by the changing magnetic field attributed to electrically non-conducting ferrite.

In preference the transmit coil is substantially larger than the detector coil and is positioned substantially over the target volume and the receive coil is moved within the transmit coil to effect searching for any metallic target object.

The larger transmit coil is a very useful feature for it substantially eliminates dynamic range problems. In addition, it increases the depth capability of the detector. A normal coil produces an inverse cubic law with respect to the transmitting signal, which on re-transmission by the metallic object also follows an inverse cubic law. This means that the signal sampled by the receiving coil has decreased by an exponential actor of six. In the case of a very large coil, the field is substantially uniform in depth thereby the received signal by the coil has only decreased by an exponential factor of three. This effectively doubles the depth for detection of metallic particles as compared with a normal size coil.

In preference the at least one more measurement period is included such that the said at least one more measurement period occurs during a period of non-transmission of the magnetic field in which the detected signal contribution due to both the decay of ground eddy currents and electrically non-conducting ferrite within the target volume is substantially zero.

In preference the measurement means comprises an amplifier means for amplifying the detected signal;

a plurality of demodulating means for synchronously demodulating the amplified detected signal;

an inverting means for inverting the amplified detected signal, whereby the inverting means is connected to at least one of the demodulating means; and a low pass filter means for filtering the outputs of the plurality of demodulating means.

Alternatively there is proposed a conducting metal detection apparatus comprising:

transmission means for transmitting a discontinuous pulse voltage waveform to provide a magnetic field in a target volume, the discontinuous pulse voltage waveform providing periods of non-transmission of the magnetic field;

a detector coil for producing a detected signal by detecting changes in the magnetic field;

measurement means for measuring the detected signal within a time interval which is separate from a period having a significant signal resulting from decay of ground eddy currents, wherein the measuring occurs during the periods of non-transmission of the magnetic field;

means for synchronously demodulating the detected signals such that a first demodulated signal is derived from a first period following a transition in the transmission of the magnetic field and a second demodulated signal is derived from a second period following a transition in the transmission of the magnetic field, both first and second periods being subsequent to a time necessary for substantial decay of ground eddy currents, the demodulation occurring during the period of non-transmission; and processing means for processing the demodulated signals by comparing respective magnitudes of the demodulated signals to provide an output signal substantially independent of a background environment having a substantial quantity of material with a substantial magnetic effect and a reactive to resistive response ratio which is substantially independent of a transmitted frequency below 100 kHz, wherein the transmission means provides a transmit signal which consists of a sequence of pulses repeated continuously for a selected time in which at least one of the pulses in the sequence is of a different period than that of least one other pulses in the sequence and the detected signals being synchronously demodulated with respect to the transmitted repetitively pulsed magnetic field.

In preference the processing means processes at least three demodulated signals by forming at least two different linear combinations of the at least three demodulated signals, wherein at least one of the demodulated signals is obtained for a transmit sequence of pulses whose sequence is of a different period to the other demodulated signals, and provides at least two output signals substantially independent of a background environment having a substantial quantity of material with a substantial magnetic effect and a selecting means adapted to select one of the at least two output signals with the largest magnitude.

In preference the detected signals are synchronously demodulated such that the net time averaged linear combination of asynchronous background flux is substantially zero.

In preference the means for synchronously demodulating comprises a plurality demodulators, and the detected signals are synchronously demodulated such that the following equation is satisfied:

$$\sum_{i=1}^{n} S_i P_i = 0,$$

where $S_i$ is a relative effective gain of an $i^{th}$ synchronous demodulator and the sign of $S_i$ is consistent with the polarity of the pulse being demodulated, and $P_i$ is the relative period for which the $i^{th}$ synchronous demodulator is "on".

In preference the means for synchronously demodulating comprises a plurality of demodulators, said detection apparatus further comprising filter means for filtering outputs of the demodulators, and means for inverting the detected signals, whereby the non-inverted detected signals are input to a first set of said demodulators and inverted detected signals are input to a second set of said demodulators, the first and second demodulators operating on the detected signals according to the following equation:

$$\sum_{i=1}^{n} S_i P_i = 0,$$

where $S_i$ is a relative effective gain of an $i^{th}$ synchronous demodulator and the sign of $S_i$ is consistent with the polarity of the pulse being demodulated, and $P_i$ is the relative period for which the $i^{th}$ synchronous demodulator is "on".

Alternatively there is proposed a method of conducting metal detection comprising the steps of:

transmitting a discontinuous pulse voltage waveform to form a magnetic field in a target volume, the discontinuous pulse voltage waveform providing periods of non-transmission of the magnetic field;

detecting changes in magnetic fields, the changes being dependent upon the time duration of the transmitted pulse voltage waveform;

providing a detected signal indicative of the changes;

measuring the detected signal within at least a first and a second time interval which is separate from a period having a significant signal resulting from decay of ground eddy currents wherein the measuring occurs during the periods of non-transmission of the magnetic field the measuring being further adapted to produce a first and a second measurement respectively; and processing at least two of the measurements to provide an output signal derived by substantially removing that component of the detected signal due to the electrically non-conducting ferrite constituents in the target volume from the said detected signal by forming a combination of the at least two measurements in a manner which recognises that the first time derivative of the electrically non-conducting ferrite during periods of non-transmission depends upon the duration and temporal evolution of the magnetic field, the output signal thus being useful to indicate the presence of a metal object within the target volume.

In preference the processing steps further comprises the steps of:

multiplying at least one of the measurements by a constant;

subtracting the multiplied measurement from at least one of the other measurements.

In preference the multiplying step is such that a summation of the processed measurements after multiplication is zero when the measurements before multiplication correspond to a detected signal induced by the changing magnetic field attributed to electrically non-conducting ferrite.

In preference the processing steps further comprises the steps of:

multiplying at least one of the measurements; and subtracting the multiplied measurement from at least one other measurement, the multiplication being selected so that a summation of the processed measurements after multiplication is zero when the measurements before multiplication correspond to a detected signal induced by the changing magnetic field attributed to electrically non-conducting ferrite.

Alternatively there is proposed a method of conducting metal detection comprising the steps of:

transmitting a discontinuous pulse voltage waveform having pulses of both positive and negative magnitudes for predetermined durations such that a magnetic field is produced in a target volume and has a net time average value of substantially zero;

detecting changes in magnetic fields, the changes being dependent upon the time duration of the transmitted pulse voltage waveform; providing a detected signal indicative of the changes;

measuring average magnitudes of the detected signal during at least a first and a second selected period of time and within a time interval separate from a period having a significant signal resulting from decay of ground eddy currents; and processing a plurality of the measurements by multiplying the magnitude of at least one of the measurements and subtracting the so multiplied magnitude from the magnitude of at least one of the other measurements to provide an output signal derived by substantially removing that component of the detected signal due to the electrically non-conducting ferrite constituents in the target volume from the said detected signal by forming a linear combination of the at least two measurements in a manner which recognises that the first time derivative of the electrically non-conducting ferrite constituents is dependent on the duration and temporal evolution of the magnetic field, the output signal thus being useful to indicate the presence of a metal object within the target volume.

In preference the pulses of the pulse voltage waveform are separated by periods of non-transmission and wherein some of the pulses are of different duration.

In preference the demodulating step comprises the step of demodulating using a plurality of synchronous demodulators, such that the following equation is followed:

$$\sum_{i=1}^{n} S_i P_i = 0,$$

where $S_i$ is a relative effective gain of an $i^{th}$ synchronous demodulator and the sign of $S_i$ is consistent with the polarity of the pulse being demodulated, and $P_i$ is the relative period for which the $i^{th}$ synchronous demodulator is "on".

In preference the method further comprises the step of inverting the detected signals before the demodulating step, and wherein the demodulating signals before the demodulating step, and wherein the demodulating step comprises the step of demodulating using a plurality of synchronous demodulators, whereby inverted detected signals are demodulated by certain ones of the synchronous demodulators and non-inverted detected signals are demodulated by other ones of the synchronous demodulators, such that the following equation is followed:

$$\sum_{i=1}^{n} S_i P_i = 0,$$

where $S_i$ is a relative effective gain of an $i^{th}$ synchronous demodulator and the sign of $S_i$ is consistent with the polarity of the pulse being demodulated, and $P_i$ is the relative period for which the $i^{th}$ synchronous demodulator is "on".

In preference the duration of the pulses ranges from 0.5 ms to 5 µs.

In preference the steps of supplying power from a power source during a part of the pulse voltage waveform and recharging the power source during another part of the pulse voltage waveform.

In preference the steps of supplying power from a power source during a part of the pulse voltage waveform and recharging the power source during another part of the pulse voltage waveform.

In preference the measuring step comprises the steps of measuring a first magnitude of the detected signal at least once during a latter part of the transmission period of the pulse voltage waveform, and measuring a second magnitude of the detected signal at least once during the non-transmission period following a delay period after commencement of the non-transmission period, a proportion of the second magnitude being subtracted from the first magnitude and compared to a magnitude of the detected signal measured at least once during non-transmission.

Alternatively there is proposed a method of conducting metal detection comprising the steps of:

generating and applying to a transmit coil a discontinuous pulse voltage waveform to form a magnetic field in a target volume, wherein the discontinuous pulse voltage waveform provides periods of non-transmission to the magnetic field;

detecting changes in magnetic fields, the changes being dependent upon the duration of the transmitted pulse voltage waveform;

providing a detected signal indicative of the changes;

synchronously demodulating the detected signals during non-transmission periods of the magnetic field to provide a first demodulated signal derived from a first period during one non-transmission period and a second demodulated signal derived from a second period during same or another non-transmission period such that both first and second periods begin a delay time after the start of the respective non-transmission periods, the delay time being of a duration necessary for substantial decay of ground eddy currents; and processing the demodulated signals by comparing the demodulated signals to provide an output signal substantially free of that component of the detected signal due to electrically non-conducting ferrite constituents in the target volume with a substantial effect and a reactive to resistive response ratio which is substantially independent of an interrogating frequency below 100 kHz from the said detected signal by forming a linear combination of the demodulated signals in a manner which recognises that the first time derivative of the electrically non-conducting ferrite constituents is dependent on the duration and temporal evolution of the magnetic field, the output signal thus being useful to indicate the presence of a metal object within the target volume.

In preference the transmitted magnetic field consists of a sequence of pulses repeated continuously for a selected time, a period between transitions within the sequence of pulses being different and the detected signals being synchronously demodulated with respect to the transmitted magnetic field.

In preference the detected signals are synchronously demodulated such that the net time averaged linear combination of asynchronous background flux is substantially zero.

In preference the detected signals are synchronously demodulated such that the net time averaged linear combination of asynchronous background flux is substantially zero.

In preference the demodulating step comprises the step of demodulating using a plurality of synchronous demodulators, such that the following equation is followed:

$$\sum_{i=1}^{n} S_i P_i = 0,$$

where $S_i$ is a relative effective gain of an $i^{th}$ synchronous demodulator and the sign of $S_i$ is consistent with the polarity of the pulse being demodulated, and $P_i$ is the relative period for which the $i^{th}$ synchronous demodulator is "on".

In preference the method further comprises the step of inverting the detected signals before the demodulating step, and wherein the demodulating step comprises the step of demodulating using a plurality of synchronous demodulators, whereby inverted detected signals are demodulated by certain ones of the synchronous demodulators and non-inverted detected signals are demodulated by other ones of the synchronous demodulators, such that the following equation is followed:

$$\sum_{i=1}^{n} S_i P_i = 0,$$

where $S_i$ is a relative effective gain of an $i^{th}$ synchronous demodulator and the sign of $S_i$ is consistent with the polarity of the pulse being demodulated, and $P_i$ is the relative period for which the $i^{th}$ synchronous demodulator is "on".

In preference the steps of supplying power from a power source during a part of the pulsed magnetic field and recharging the power source during the collapsing part of the pulsed magnetic field.

In preference the processing step comprises the step of subtracting an adjustable portion of at least one of the measurements made during the transmission from at least one of the other measurements made during non-transmission.

DETAILED DESCRIPTION OF THE INVENTION

To assist with an understanding of the present invention, definitions and background physics will be presented.

The term "first order objects" refers to target objects that can be represented magnetically as a single inductor L loaded with a single resistor R. The magnetic field transmitted by the transmission means of the detector can induce currents in these first order objects. The characteristic frequency w of these objects is defined as R/L.

Mildly electrically conducting soils can be represented by a continuum of first order objects. The distribution of w for an area of such ground, with a diameter in the order of 1 m, is significant only at high frequencies and is at a maximum at frequencies of the order of 1 MHz.

This invention uses knowledge of the exact form of FRD to completely cancel that component of the received signal through demodulation and processing of the received signal. Given any transmission pulse duration, it can be shown that it is possible to take temporal sections of the signal due to FRD, average those sections individually, then form a non-trivial linear combination of those averages which produces a null resultant signal.

A clearer explanation can be given mathematically. Let the period of the applied field of linearly increasing intensity be τ. Let the boundaries of the sampling period be $t_i$ and $t'_i$, where i is the label of a particular sampling period and t is the beginning of that period and t is its end; t=0 is at the end of the applied field. Let the integral over time of the signal during such a period be labelled $P_i$. Then $$P_i = \int_{t_i}^{t'_i} V(t)dt = A \int_{t_i}^{t'_i} \frac{dM}{dt} \tag{3}$$

The factor A is a constant applicable to each of the sampling periods. V(t) is the received voltage signal and is proportional to the rate of FRD. There exists a linear combination of at least two such integrals such that $$\sum_{i=1}^{N} G_i P_i = 0 \tag{4}$$

where the $G_i$ are the coefficients and not all are equal to zero. Note that this expression will hold for the same $G_i$ regardless of the value of A. If the set of coefficients $G_i$ is found to effect this cancellation, including the signal due to the decay of eddy currents in metallic target objects in V(t) will alter the averaged signal samples so that, in general, the linear combination of equation (4) will no longer produce a null result.

It is also desirable to cancel the asynchronous signals due to changes in the flux of the geomagnetic field of the earth and the weak magnetic fields of rocks linking the receiving coil. Variations in the said flux are produced by the movement of the receiving coil through these fields. The repetition frequency of a pulse cycle in this invention is fast enough compared with the velocity of the receiving coil over the target volume that the second time derivative of the asynchronous flux linked will be very small. Therefore, these asynchronous signals can be sampled over some part of the transmission cycle and that part of the said signals can be taken to be typical of their counterparts over the remainder of the transmission cycle. The inclusion of another term in the linear combination effects the negation of the signals due to these asynchronous magnetic fields.

BRIEF DESCRIPTION OF THE DRAWINGS

To assist with the explanation of the present invention, reference will now be made to the accompanying illustrations;

The output of the operational amplifier goes to a signal integrator which is the capacitor C.

FIGS. 2(a)–2(d) is related to FIG. 1. The horizontal axis represents the passage of time with the datum t=0 occurring at the moment of cessation of the transmission voltage pulse. Although none of the transmission means is shown in FIG. 1, one of the traces shows a pulse representing the period during which a magnetic signal is transmitted in isolation from any other transmitted pulses. The periods $P_1$, $P_2$, and $P_3$ represent the periods for which the switches $S_1$, $S_2$ and $S_3$ in FIG. 1 are closed, respectively. Note that the first demodulation period, $P_1$, occurs some time after the cessation of the transmission period, to allow the decay of both the current in the critically damped transmitting coil and the eddy currents in the conductive ground. Note also that the third demodulation period, $P_3$, commences at a time $t_3$ which has a value of several fold transmission periods. At this time, the remanent magnetic field is less than one percent of its value close to t=0 and is very weak in absolute terms. $P_3$ is used to measure the signal due to the asynchronous signals of the surrounding rocks and the geomagnetic field. The values of the resistors $R_1$, $R_2$ and $R_3$ are selected to determine the gains, $G_i$, in the equation $$\sum_{i=1}^{3} G_i P_i = 0. \tag{5}$$

Figure 3:
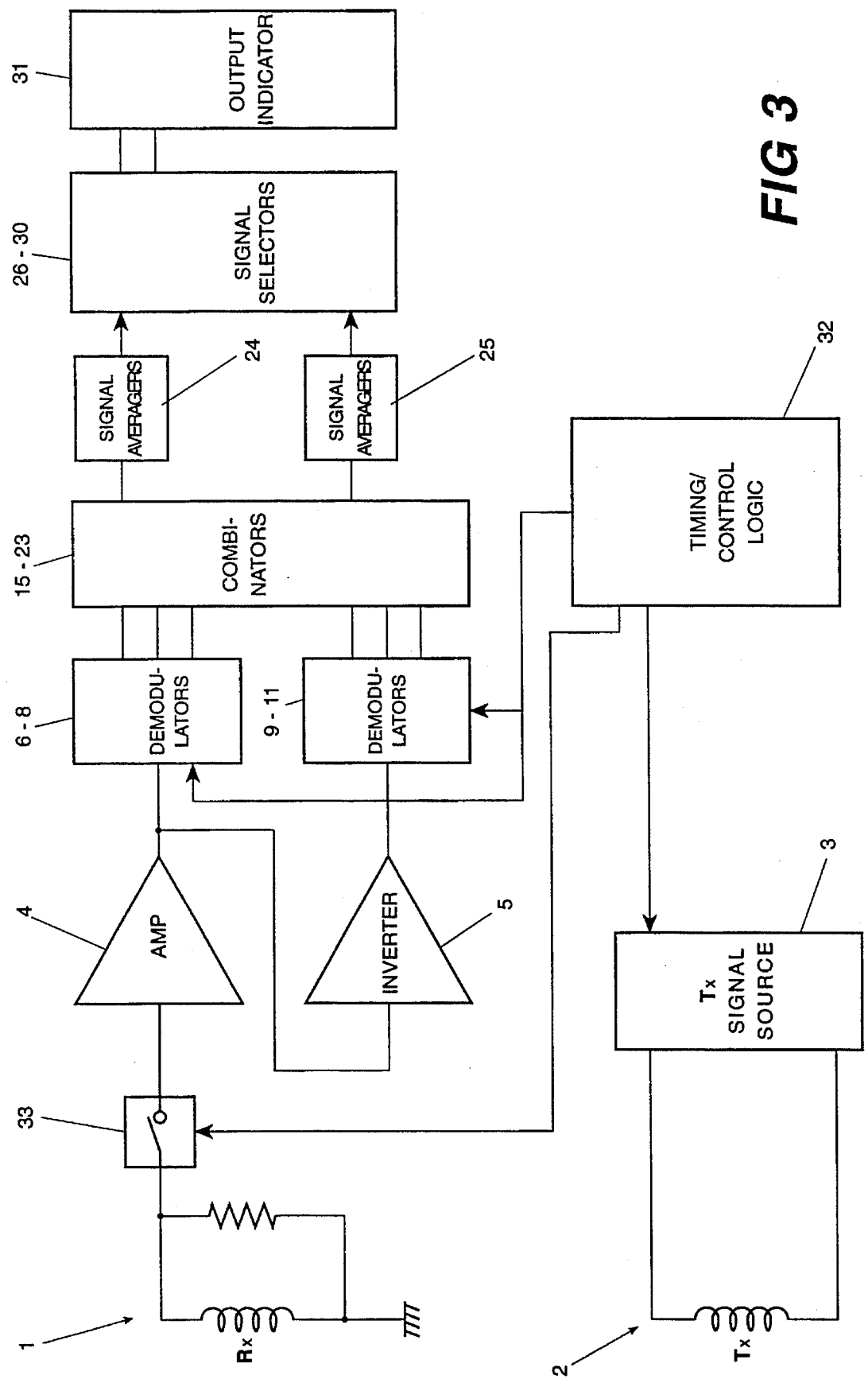
Figure 4:
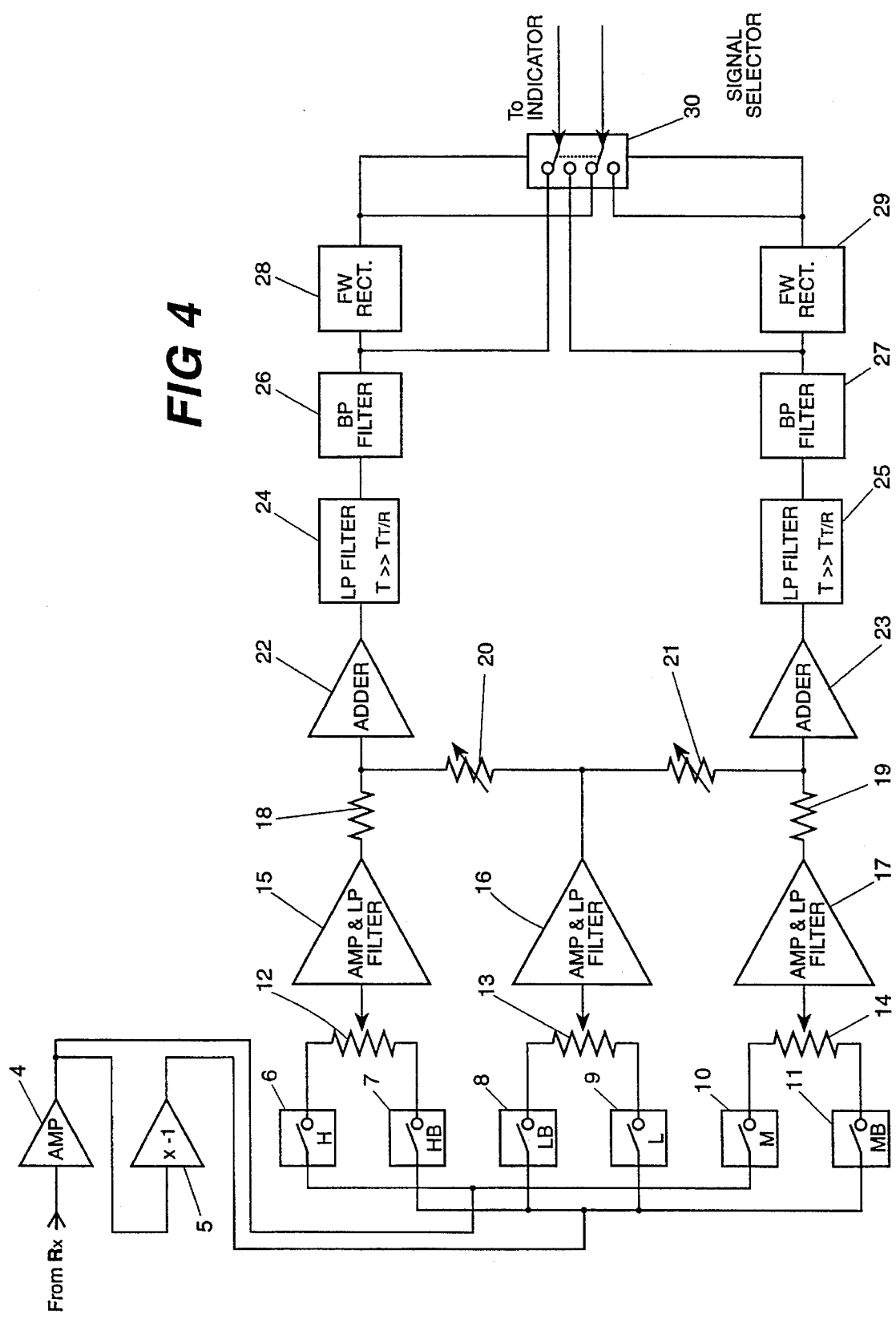

Expansion of this expression in terms of the received signal and ultimately in terms of the duration and sampling periods leads to the expression $$\sum_{i=1}^{3} G_i P_i \propto \sum_{i=1}^{3} G_i \int_{t_i=k_i\tau}^{t_i'=k_i'\tau} V(t)dt \tag{6}$$

$$\propto \sum_{i=1}^{3} S_i \frac{\tau\left[(k_i'+1)\log\left(\frac{k_i'+1}{k_i'}\right)-(k_i+1)\log\left(\frac{k_i+1}{k_i}\right)\right]}{R_i}$$

$$= 0$$

wherein;

FIGS. 1 and 2(a)–2(d) show a simplified illustration of the receiving demodulating and sampling circuit and a simplified illustration of the timing waveforms to help explain the principles of the concept of this invention;

FIG. 3 shows a block diagram of a preferred embodiment of this invention;

FIG. 4 shows the demodulating, sampling and processing sections of the receiving circuit according to the same preferred embodiment in a schematic diagram with detail greater than that of FIG. 3; and FIGS. 5(a)–5(h) shows the pertinent timing waveforms for the same embodiment of the invention.

DETAILED DESCRIPTION OF THE DRAWINGS

Figure 1:
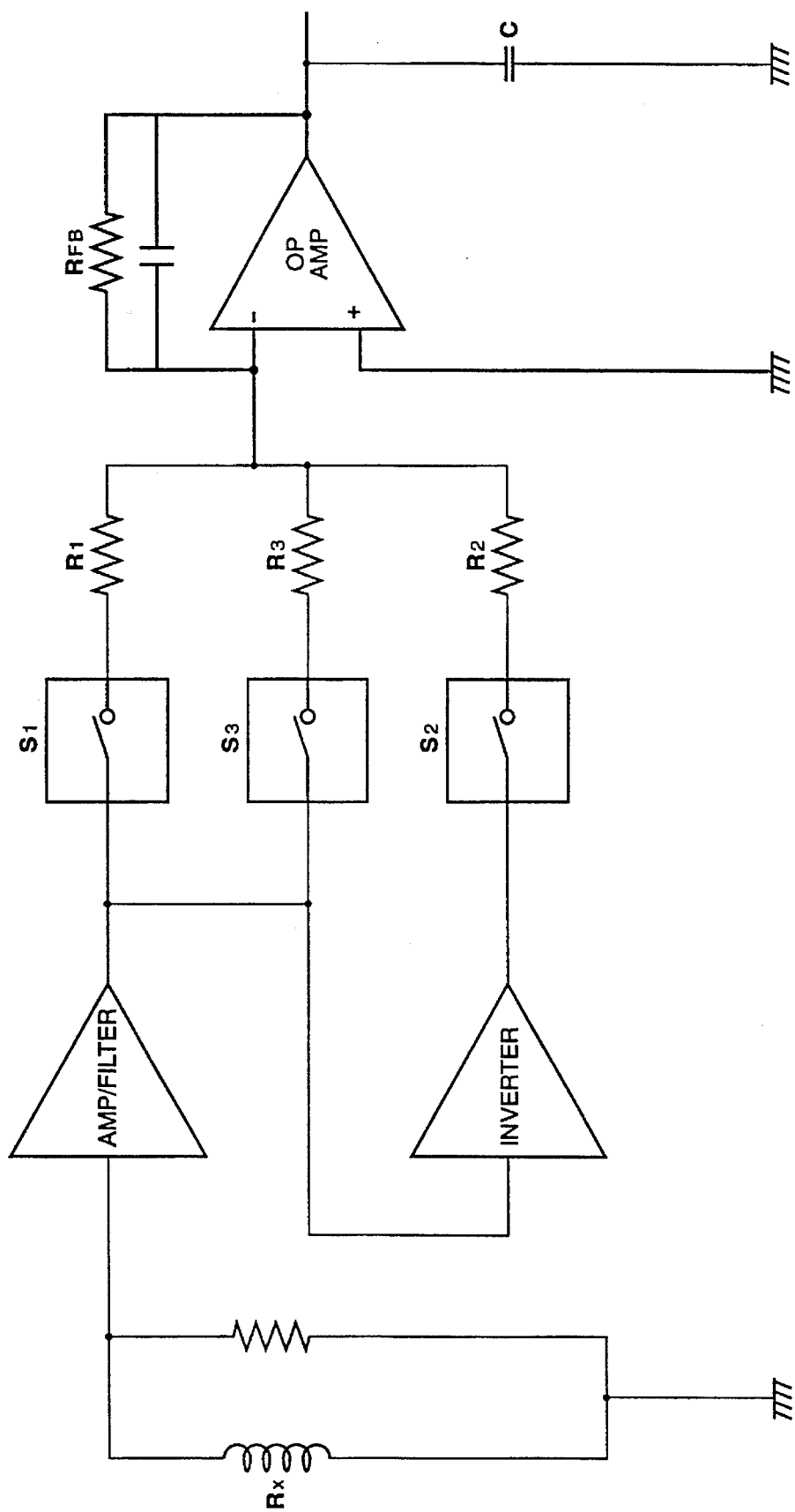
Figure 2:
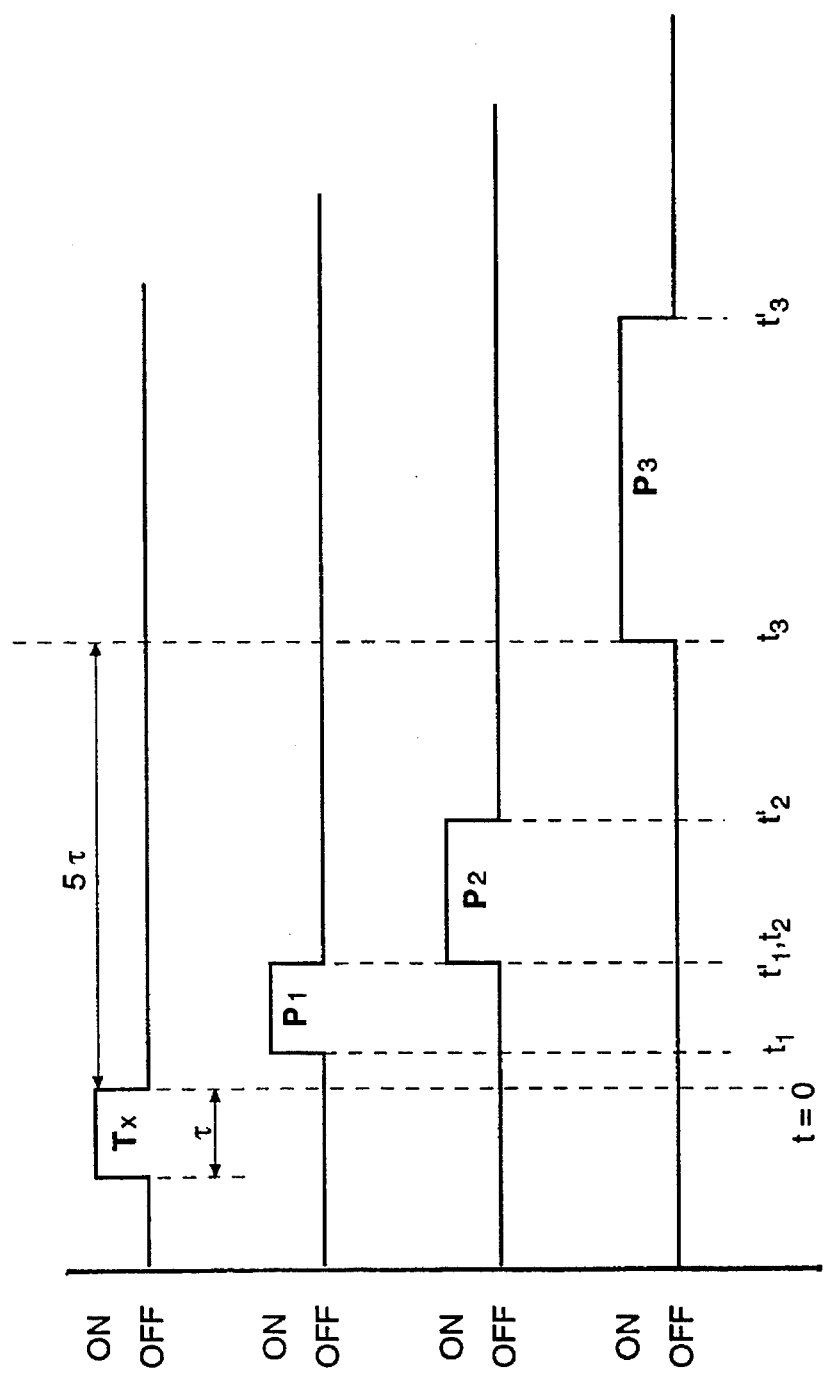
FIGS. 2(a)–2(d) shows a timing diagram drawn to illustrate the principles of operation of this invention.

FIG. 1 shows schematic circuit diagram drawn to illustrate the principles of operation of this invention. It shows a critically damped receiving coil whose signal is fed to an amplifier and filter circuit. The output of the amplifier is bifurcated, one of the branches going to an inverter with unity gain. The uninverted signal is again bifurcated and the resultant three signal paths are directed each through a resistor and an independently operated switch to a summing junction of an operational amplifier with negative feedback.

Note that $S_i$ in the last summation of equation (6) is plus or minus 1, depending upon whether the ith. term is to be added or subtracted. The terms $k_i$ and $k'_i$ are factors facilitating the expression of the times after the t=0 in terms of the transmission period $\tau$.

Equation (6) generally produces a null only when the received signal is that of the FRD and the variations in flux from rocks and the geomagnetic field through the receiving coil. However, there are specific instances where the signal from a first order object could also produce a null, given the same values of $G_i$ as for FRD nulling. The response of a first order object with characteristic frequency is approximately $$Obj(\omega) \propto \sum_{i=1}^{3} S_i G_i[(1-\exp(-\omega t)) - \omega t][\exp(-k_i'\omega t) - \exp(-k_i\omega t)] \tag{7}$$

where $S_i$, $k_i$, and $k'_i$ have the same meanings as in equation (6). The expressions in equations (6) and (7) can be generalised to any number of samples and gains.

In the preferred embodiment of this device, six sampling periods and six associated gain values are used instead of the three sampling periods and gains used to illustrate the principle, c.f. Equation (5). As will be explained further in this invention, these samples are processed in such a way as to reduce the signal to noise ratio required of this invention when detecting a wide range of first order objects.

FIG. 3 shows a block diagram of the overall operation of the invention. Control and timing signals for the receiving, transmitting and demodulating circuit switches come from (32). Some time after transmission of a magnetic pulse ceases, the receiving switch (33) is closed. The signal from the receiving coil is amplified by the amplifier (4). The output from (4) is bifurcated, with one branch being inverted with unity gain(5). Both the uninverted and inverted signals are fed into a set of six synchronous demodulators (6–11), each of which is controlled by the logic circuit (32). The signal from each demodulator is sent to a signal combinator which produces two sets of linear combinations of the signals in a way which will be described in detail farther on. Each of the emergent signals is sent to its respective low pass filter (24–25). These filters have time constants very much greater than the period of the transmit/receive cycle; it is in these filters that the greater part of the sample averaging occurs. The two averaged signals then go to a signal selector, which selects the signal with the largest absolute magnitude over a number of transmit/receive cycles to send to the indicator means for output which is accessible to the operator.

The main part of that which is novel in this invention resides within the manner in which the received signals are demodulated and processed. FIG. 4 shows a more detailed circuit description of these sections and FIGS. 5(a)–5(h) show the pertinent control timing diagrams for one complete transmit/receive cycle. After initial amplification, the received signal is sent to the amplifier (4). The output of (4) is bifurcated, with one branch connected to three separate synchronous demodulators and the other branch connected to a unity gain inverter (5), the output of which is connected to another three separate synchronous demodulators. The six said demodulators are analogue switches labelled (6), (7), (8), (9), (10), (11). Each of these switches presents an essentially infinite impedance at its output when open; when closed it has a low impedance output with the same voltage as at its input. The state of each switch, that is whether it is opened or closed, is controlled by a digital signal generated synchronously with the transmitter pulse logic.

The switch pulses for one complete cycle of transmission and reception are shown in the timing diagram FIGS. 5(a)–5(h), a high pulse state indicates that the respective switch is closed, while a low state indicates that the respective switch is opened. The switch timing for the transmitter is included for clarity, although none of the transmitting means circuit appears in FIG. 4. There are three primary sampling periods shown, labelled H, M and L. Each primary sampling period has an associated balance sampling period, not necessarily of equal duration, labelled HB, MB and LB.

A table showing the combinations of signals, switches and timing sequences which constitute the six demodulators is shown below:

| DEMOD | SIGNAL | TIMING |
| --- | --- | --- |
| (6) | Non-inverted | H |
| (7) | Inverted | HB |
| (8) | Inverted | L |
| (9) | Non-inverted | LB |
| (10) | Non-inverted | M |
| (11) | Inverted | MB |

The output of one of the demodulators in each pair is connected to the output of the other demodulator of the same pair through a trimpot (12–14). The wiper of each trimpot is connected to an inverting amplifier with gain and low-pass filter characteristics (15–17). This constitutes creating linear combinations of the pairs of samples. The signals from each pair of demodulators shall now be referred to as HS for the H, HB combination, MS for the M, MB combination and LS for the L, LB combination.

A linear combination of HS and LS is summed at the inverting input of the adder (22). A linear combination of MS and LS is summed at the inverting input of the adder (23). The coefficients of these linear combinations are adjusted by setting the values of resistors (18–21). The values of variable resistors (20–21) can be varied by the operator to compensate for slow, small drifts in conditions such as power supply voltage.

The outputs of these low pass filters and adders are connected to respective low pass filters (24–25) with time constants of the order of 0.1 s, that is some orders of filters magnitude greater than the transmission cycle period; thus they serve to average the demodulated signals. In FIG. 4, the T of (24, 25) refers to the time constant of (24, 25), while $T_{T/R}$ refers to the period of the transmit/receive cycle. Each output from the signal averagers is sent through a band pass filter to a full wave rectifier (28, 29), thence to a signal selector (30). The signal selector (30) responds to the larger of the outputs of (28) and (29); if the output of (28) is the larger signal, the output signals of (26) and (28) are sent through to the means of indication; if the output of (29) is the larger signal, the output signals of (27) and (29) are switched through to the means of indication.

In FIG. 5(b) the Tx waveform indicates the timing of the transmit voltage applied to the transmitting coil and shows that there are two different durations for the transmitting periods in a complete transmit/receive cycle. The duration of the first transmission period, as depicted in the waveform diagram, is four times that of the other four transmission periods. The M and MB sampling periods, as well as the L sampling period, occur during the reception period immediately after the long transmission period. There are four sets of H and HB sampling periods, each of which occurs during the reception period immediately following one of the four short transmission periods in a train of short transmission pulses.

The received signals due to some particular first order objects with a particular range of characteristic frequencies will be similar, in form but not necessarily magnitude, to the received signals due to the FRD from some particular duration of interrogating pulse. The similarity of form between the paricular first order objects and FRD signals demands very accurate electronics in the device in order to reliably indicate the presence of a first order object. Some of these particular first order objects would not be detected, that is there would be a "hole" in the response of the detector. However, if the duration of the interrogating pulse is changed, the form of the FRD changes (refer equation (2)) while that of the first order object remains the same (equation 7); the respective signals are now dissimilar and that part of the received signal due to the first order object is easily discerned.

It should be noted that this invention could not generally null the signal due to FRD if the principles of synchronous demodulation were combined with the teachings of Corbyn. Corbyn teaches that the form of the magnetization of the ferrites is independent of the "primary magnetic field", that is the transmitted field, and gives an expression for the time derivative of the magnetization which does not include the duration of the transmitted pulse as a variable. This expression does not generally describe the FRD due to transmitted magnetic fields of general duration and general time evolution, but only the FRD due to the duration and form of the transmitted fields of Corbyn's device. Were Corbyn's cited relation (1) a suitable representation of the FRD evoked by the transmitted fields of Corbyn's detector, it would be useful for designing and building another detector only if that detector used a transmission coil with the same electrical characteristics as the transmission coil of Corbyn's device and the duration of the transmission pulses is the same as the duration of the transmission pulses of Corbyn's device. That the cited relation (1) is a poor representation even of the specific instance of FRD evoked by Corbyn's detector renders that relation even less useful in the design of a metal detector.

Further, according to Corbyn's teachings, those first order object signals which are similar to the FRD signals present after transmission pulses of one particular duration would be similar to FRD signals due to transmission pulses of all durations, since according to Corbyn the form of the FRD is independent of the transmitted pulse. Therefore, it would not be possible to remove the hole in the response of the detector, nor to relax the otherwise stringent requirements of the electronic circuitry, using different durations of transmitted pulse. Hence, were one to follow Corbyn's teachings, the idea of altering the duration of the transmitted pulses in order to easily detect first order objects of widely ranging characteristic frequencies could not be conceived of.

The sample period L is used to provide the substantial part of the signal for cancelling the FRD; hence it is inverted before being added the HS and MS signals. The sample period LB is used to cancel that part of the signal due to the movement of the receiving coil through the static fields of the environment. Note that the LB period commences about $5\tau$ after the cessation of the last transmission pulse and also about $5\tau$ after the first, long, transmission pulse; at this time, the FRD signal is less than 1% of its original value and very low in absolute terms and the eddy currents in any first order objects in the ground have substantially decayed to zero. Therefore, the only signal during the MB period is that due to spatial variations in the ground inducing signals in the receiving coil as it moves through those fields.

There are several assumptions, which have been made when discussing the theory of operation of the novel part of this invention, departures from which significantly affect the operation of this invention in its preferred form. It was assumed, when presenting equation (2), that the transmitting coil circuit was not damped and that the coil current would increase linearly with time whilst a constant voltage was held across it. It was also assumed that the current in the same coil desisted immediately any voltage applied across it was removed. These two assumptions were part of the idealisation which led to the expression of equation (2).

The assumption of linear increase of current in the transmitting coil becomes less accurate as the duration of the transmitted pulse increases; the current tends asymptotically to a maximum value which depends upon the quality factor of the circuit and the applied voltage. Both of these breakdowns of the assumptions are accommodated by adjusting the gains of the linear combinations of the pertinent signals.

Another assumption made during the discussion of the theory of operation of this invention in its preferred embodiment was that transmitted pulses were transmitted in isolation, that is all FRD signals received by the receiving means were due to the single pulse under discussion and that any other pulses were transmitted such a long time previous to the one under discussion that its effects were substantially zero. This assumption is compromised for the H and HB sample periods, as the FRD signals due to the long transmitted pulse as well as any short pulses transmitted before the sampling period in question, during any one transmit/receive cycle, will significantly affect the signal. Again, this can be accommodated by a small change in the gains applied to the signals to be combined through adjustment of resistors (20) and (21).

I claim:

1. A conducting metal detection apparatus comprising:

transmission means including a transmit coil for transmitting a discontinuous pulse voltage waveform in order to transmit a magnetic field to a target volume, the discontinuous pulse voltage waveform providing periods of non-transmission of the magnetic field;

a detector coil for producing a detected signal by detecting changes in magnetic fields;

measurement means for measuring the detected signal during at least a first and second pre-determined period which is separate from that period which has significant signal resulting from decay of ground eddy currents, the measuring occurring during the periods of non-transmission of the magnetic field, the measurement means producing at least a first and a second measurement respectively; and processing means for processing at least two of the measurements to provide an output signal derived by substantially removing that component of the detected signal due to electrically non-conducting ferrite within the target volume from the said detected signal by forming a combination of the at least two measurements, said combination being dependent upon the first time derivative of the magnetic field due to the electrically non-conducting ferrite during the periods of non-transmission, wherein the first time derivative of the magnetic field is dependent upon the duration and temporal evolution of the transmitted magnetic field, the output signal thus being useful to indicate the presence of a metallic object within the target volume.

2. A conducting metal detection apparatus as in claim 1 wherein the combination is a linear combination, said linear combination of the at least two measurements including the process of multiplying each measurement by a constant each said constant not necessarily the same as any other said constant and subtracting at least one such multiplied measurement from at least one other such multiplied measurement.

3. A conducting metal detection apparatus as in claim 1 wherein the combination is a linear combination, said linear combination of the at least two measurements including the process of multiplying each measurement by a constant each said constant not necessarily the same as any other said constant and subtracting at least one such multiplied measurement from at least one other such multiplied measurement, each of the constants being selected so that a summation of the so processed measurement after the linear combination is zero when the measurements before the linear combination correspond to a detected signal induced by the changing magnetic field attributed to electrically non-conducting ferrite.

4. A conducting metal detection apparatus as in claim 2 wherein the constants are selected so that a summation of the so processed measurements is zero where the signals before the said processing correspond to a detected signal induced by the changing magnetic field attributed to electrically non-conducting ferrite.

5. A conducting metal detection apparatus as in claim 4 wherein the transmit coil is substantially larger than the detector coil and is positioned substantially over the target volume and the receive coil is moved within the transmit coil to effect searching for any metallic target object.

6. A conducting metal detection apparatus as in claim 1 wherein at least one more measurement period is included such that the said at least one more measurement period occurs during a period of non-transmission of the magnetic field in which the detected signal contribution due to both the decay of ground eddy currents and electrically non-conducting ferrite within the target volume is substantially zero.

7. A conducting metal detection apparatus as in claim 1 wherein the measurement means comprises an amplifier means for amplifying the detected signal;
- a plurality of demodulating means for synchronously demodulating the amplified detected signal;
- an inverting means for inverting the amplified detected signal, whereby the inverting means is connected to at least one of the demodulating means; and
- a low pass filter means for filtering the outputs of the plurality of demodulating means.

8. A conducting metal detection apparatus comprising:
transmission means for transmitting a discontinuous pulse voltage waveform to provide a magnetic field in a target volume, the discontinuous pulse voltage waveform providing periods of non-transmission of the magnetic field;

a detector coil for producing a detected signal by detecting changes in the magnetic field;

measurement means for measuring the detected signal within a time interval which is separate from a period having a significant signal resulting from decay of ground eddy currents, wherein the measuring occurs during the periods of non-transmission of the magnetic field;

means for synchronously demodulating the detected signals such that a first demodulated signal is derived from a first period following a transition in the transmission of the magnetic field and a second demodulated signal is derived from a second period following a transition in the transmission of the magnetic field, both first and second periods being subsequent to a time necessary for substantial decay of ground eddy currents, the demodulation occurring during the period of non-transmission; and processing means for processing the demodulated signals by comparing respective magnitudes of the demodulated signals to provide an output signal substantially independent of a background environment having a substantial quantity of material with a substantial magnetic effect and a reactive to resistive response ratio which is substantially independent of a transmitted frequency below 100 kHz, wherein the transmission means provides a transmit signal which consists of a sequence of pulses repeated continuously for a selected time in which at least one of the pulses in the sequence is of a different period than that of least one other pulses in the sequence and the detected signals being synchronously demodulated with respect to the transmitted repetitively pulse magnetic field, said output signal being dependent upon the first time derivative of the electrically non-conducting ferrite during periods of non-transmission, the first time derivative of the magnetic field being dependent upon the duration and temporal evolution of the magnetic field, the output signal thus being useful to indicate the presence of a metal object within the target volume.

9. A conducting metal detection apparatus as in claim 8 wherein the processing means processes at least three demodulated signals by forming at least two different linear combinations of the at least three demodulated signals, wherein at least one of the demodulated signals is obtained for a transmit sequence of pulses whose sequence is of a different period to the other demodulated signals, and provides at least two output signals substantially independent of a background environment having a substantial quantity of material with a substantial magnetic effect and a selecting means adapted to select one of the at least two output signals with the largest magnitude.

10. A conducting metal detection apparatus as in claim 8 wherein the detected signals are synchronously demodulated such that the net time averaged linear combination of asynchronous background flux is substantially zero.

11. A conducting metal detection apparatus as in claim 8 wherein the means for synchronously demodulating comprises a plurality of demodulators, and the detected signals are synchronously demodulated such that the following equation is satisfied:

$$\sum_{i=1}^{n} S_i P_i = 0,$$

where $S_i$ is a relative effective gain of an $i^{th}$ synchronous demodulator and the sign of $S_i$ is consistent with the polarity of the pulse being demodulated, and $P_i$ is the relative period for which the $i^{th}$ synchronous demodulator is "on".

12. A conducting metal detection apparatus as in claim 8 wherein the means for synchronously demodulating comprises a plurality of demodulators, said detection apparatus further comprising filter means for filtering outputs of the demodulators, and means for inverting the detected signals, whereby the non-inverted detected signals are input to a first set of said demodulators and inverted detected signals are input to a second set of said demodulators, the first and second demodulators operating on the detected signals according to the following equation:

$$\sum_{i=1}^{n} S_i P_i = 0,$$

where $S_i$ is a relative effective gain of an $i^{th}$ synchronous demodulator and the sign of $S_i$ is consistent with the polarity of the pulse being demodulated, and $P_i$ is the relative period for which the $i^{th}$ synchronous demodulator is "on".

13. A method of conducting metal detection comprising the steps of:
transmitting a discontinuous pulse voltage waveform to form a magnetic field in a target volume, the discontinuous pulse voltage waveform providing periods of non-transmission of the magnetic field;

detecting changes in magnetic fields, the changes being dependent upon the time duration of the transmitted pulse voltage waveform;

providing a detected signal indicative of the changes;

measuring the detected signal within at least a first and a second time interval which is separate from a period having a significant signal resulting from decay of ground eddy currents wherein the measuring occurs during the periods of non-transmission of the magnetic field the measuring being further adapted to produce a first and a second measurement respectively; and processing at least two of the measurements to provide an output signal derived by substantially removing that component of the detected signal due to the electrically non-conducting ferrite constituents in the target volume from the said detected signal by forming a combination of the at least two measurements, said combination being dependent upon the first time derivative of the electrically non-conducting ferrite during periods of non-transmission, wherein the first time derivative of the magnetic field is dependent upon the duration and temporal evolution of the magnetic field, the output signal thus being useful to indicate the presence of a metal object within the target volume.

14. A method of conducting metal detection as in claim 13 wherein the processing steps further comprises the steps of:

multiplying at least one of the measurements by a constant;

subtracting the multiplied measurement from at least one of the other measurements.

15. A method of conducting metal detection as in claim 14 wherein the multiplying step is such that a summation of the processed measurements after multiplication is zero when the measurements before multiplication correspond to a detected signal induced by the changing magnetic field attributed to electrically non-conducting ferrite.

16. A method of conducting metal detection as in claim 13 wherein the processing steps further comprises the steps of:

multiplying at least one of the measurements; and subtracting the multiplied measurement from at least one other measurement, the multiplication being selected so that a summation of the processed measurements after multiplication is zero when the measurements before multiplication correspond to a detected signal induced by the changing magnetic field attributed to electrically non-conducting ferrite.

17. A method of conducting metal detection comprising the steps of:

transmitting a discontinuous pulse voltage waveform having pulses of both positive and negative magnitudes for predetermined durations such that a magnetic field is produced in a target volume and has a net time average value of substantially zero;

detecting changes in magnetic fields, the changes being dependent upon the time duration of the transmitted pulse voltage waveform;

providing a detected signal indicative of the changes;

measuring average magnitudes of the detected signal during at least a first and a second selected period of time and within a time interval separate from a period having a significant signal resulting from decay of ground eddy currents; and processing a plurality of the measurements by multiplying the magnitude of at least one of the measurements and subtracting the so multiplied magnitude from the magnitude of at least one of the other measurements to provide an output signal derived by substantially removing that component of the detected signal due to the electrically non-conducting ferrite constituents in the target volume from the said detected signal by forming a linear combination of the at least two measurements, said combination being dependent on the first time derivative of the electrically non-conducting ferrite constituents, wherein the first time derivative of the magnetic field is dependent on the duration and temporal evolution of the magnetic field, the output signal thus being useful to indicate the presence of a metal object within the target volume.

18. A method of conducting metal detection as in claim 17 wherein the pulses of the pulse voltage waveform are separated by periods of non-transmission and wherein some of the pulses are of different duration.

19. A method of conducting metal detection comprising the steps of:

generating and applying to a transmit coil a discontinuous pulse voltage waveform to form a magnetic field in a target volume, whether the discontinuous pulse voltage waveform provides periods of non-transmission to the magnetic field;

detecting changes in magnetic fields, the changes being dependent upon the duration of the transmitted pulse voltage waveform;

providing a detected signal indicative of the changes;

synchronously demodulating the detected signals during non-transmission periods of the magnetic field to provide a first demodulated signal derived from a first period during one non-transmission period and a second demodulated signal derived from a second period during same or another non-transmission period such that both first and second periods begin a delay time after the start of the respective non-transmission periods, the delay time being of a duration necessary for substantial decay of ground eddy currents; and processing the demodulated signals by comparing the demodulated signals to provide an output signal substantially free of that component of the detected signal due to electrically non-conducting ferrite constituents in the target volume with a substantial effect and a reactive to resistive response ratio which is substantially independent of an interrogating frequency below 100 kHz from the said detected signal by forming a linear combination of the demodulated signals, said combination being dependent on the first time derivative of the electrically non-conducting ferrite constituents, wherein the first time derivative of the magnetic field is dependent on the duration and temporal evolution of the magnetic field, the output signal thus being useful to indicate the presence of a metal object within the target volume.

20. A method of conducting metal detection as in claim 19 wherein the transmitted magnetic field consists of a sequence of pulses repeated continuously for a selected time, a period between transitions within the sequence of pulses being different and the detected signals being synchronously demodulated with respect to the transmitted magnetic field.

21. A method of conducting metal detection as in claim 19 wherein the detected signals are synchronously demodulated such that the net time averaged linear combination of asynchronous background flux is substantially zero.

22. A method of conducting metal detection as in claim 20 wherein the detected signals are synchronously demodulated such that the net time averaged linear combination of asynchronous background flux is substantially zero.

23. A method of conducting metal detection as in claim 19 wherein the demodulating step comprises the step of demodulating using a plurality of synchronous demodulators, such that the following equation is followed:

$$\sum_{i=1}^{n} S_i P_i = 0,$$

where $S_i$ is a relative effective gain of an $i^{th}$ synchronous demodulator and the sign of $S_i$ is consistent with the polarity of the pulse being demodulated, and $P_i$ is the relative period for which the $i^{th}$ synchronous demodulator is "on".

24. A method of conducting metal detection as in claim 20 wherein the demodulating step comprises the step of demodulating using a plurality of synchronous demodulators, such that the following equation is followed:

$$\sum_{i=1}^{n} S_i P_i = 0,$$

where $S_i$ is a relative effective gain of an $i^{th}$ synchronous demodulator and the sign of $S_i$ is consistent with the polarity of the pulse being demodulated, and $P_i$ is the relative period for which the $i^{th}$ synchronous demodulator is "on".

25. A method of conducting metal detection as in claim 19 further comprising the step of inverting the detected signals before the demodulating step, and wherein the demodulating step comprises the step of demodulating using a plurality of synchronous demodulators, whereby inverted detected signals are demodulated by certain ones of the synchronous demodulators and non-inverted detected signals are demodulated by other ones of the synchronous demodulators, such that the following equation is followed:

$$\sum_{i=1}^{n} S_i P_i = 0,$$

where $S_i$ is a relative effective gain of an $i^{th}$ synchronous demodulator and the sign of $S_i$ is consistent with the polarity of the pulse being demodulated, and $P_i$ is the relative period for which the $i^{th}$ synchronous demodulator is "on".

26. A method of conducting metal detection as in claim 20 further comprising the step of inverting the detected signals before the demodulating step, and wherein the demodulating signals before the demodulating step, and wherein the demodulating step comprises the step of demodulating using a plurality of synchronous demodulators, whereby inverted detected signals are demodulated by certain ones of the synchronous demodulators and non-inverted detected signals are demodulated by other ones of the synchronous demodulators, such that the following equation is followed:

$$\sum_{i=1}^{n} S_i P_i = 0,$$

where $S_i$ is a relative effective gain of an $i^{th}$ synchronous demodulator and the sign of $S_i$ is consistent with the polarity of the pulse being demodulated, and $P_i$ is the relative period for which the $i^{th}$ synchronous demodulator is "on".

27. A method of conducting metal detection as in claim 18 wherein the duration of the pulses ranges from 0.5 ms to 5 µs.

28. A method of conducting metal detection as in claim 18 further comprising the steps of supplying power from a power source during a part of the pulse voltage waveform and recharging the power source during another part of the pulse voltage waveform.

29. A method of conducting metal detection as in claim 17 further comprising the steps of supplying power from a power source during a part of the pulse voltage waveform and recharging the power source during another part of the pulse voltage waveform.

30. A method of conducting metal detection as in claim 19 further comprising the steps of supplying power from a power source during a part of the pulsed magnetic field and recharging the power source during the collapsing part of the pulsed magnetic field.

31. A method of conducting metal detection as in claim 17 wherein the measuring step comprises the steps of measuring a first magnitude of the detected signal at least once during a latter part of the transmission period of the pulse voltage waveform, and measuring a second magnitude of the detected signal at least once during the non-transmission period following a delay period after commencement of the non-transmission period, a proportion of the second magnitude being subtracted from the first magnitude and compared to a magnitude of the detected signal measured at least once during non-transmission.

32. A method of conducting metal detection as in claim 19 wherein the processing step comprises the step of subtracting an adjustable portion of at least one of the measurements made during the transmission from at least one of the other measurements made during non-transmission.

33. An apparatus as in claim 1, wherein the first time derivative of the magnetic field due to the electrically non-conducting ferrite during the periods of non-transmission has substantially the form $$\frac{dM(\tau, t)}{dt} = \log\left(\frac{\tau + t}{t}\right) - \frac{\tau}{t}$$

where $\tau$ is the period for which the said transmission occurred, t is the time elapsed since non-transmission, M is the magnetization of the ferrite and log is the natural logarithm.

34. An apparatus as in claim 8, wherein the first time derivative of the magnetic field due to the electrically non-conducting ferrite during the periods of non-transmission has substantially the form $$\frac{dM(\tau, t)}{dt} = \log\left(\frac{\tau + t}{t}\right) - \frac{\tau}{t}$$

where $\tau$ is the period for which the said transmission occurred, t is the time elapsed since non-transmission, M is the magnetization of the ferrite and log is the natural logarithm.

35. A method as in claim 13, wherein the first time derivative of the magnetic field due to the electrically non-conducting ferrite during the periods of non-transmission has substantially the form $$\frac{dM(\tau, t)}{dt} = \log\left(\frac{\tau + t}{t}\right) - \frac{\tau}{t}$$

where $\tau$ is the period for which the said transmission occurred, t is the time elapsed since non-transmission, M is the magnetization of the ferrite and log is the natural logarithm.

36. A method as in claim 17, wherein the first time derivative of the magnetic field due to the electrically non-conducting ferrite during the periods of non-transmission has substantially the form $$\frac{dM(\tau, t)}{dt} = \log\left(\frac{\tau + t}{t}\right) - \frac{\tau}{t}$$

where $\tau$ is the period for which the said transmission occurred, t is the time elapsed since non-transmission, M is the magnetization of the ferrite and log is the natural logarithm.

37. A method as in claim 19, wherein the first time derivative of the magnetic field due to the electrically non-conducting ferrite during the periods of non-transmission has substantially the form $$\frac{dM(\tau, t)}{dt} = \log\left(\frac{\tau + t}{t}\right) - \frac{\tau}{t}$$

where $\tau$ is the period for which the said transmission occurred, t is the time elapsed since non-transmission, M is the magnetization of the ferrite and log is the natural logarithm.

* * * * *